(No Model.)
J. H. O'CONNOR.
SPIGOT AND FAUCET.
No. 326,448. Patented Sept. 15, 1885.
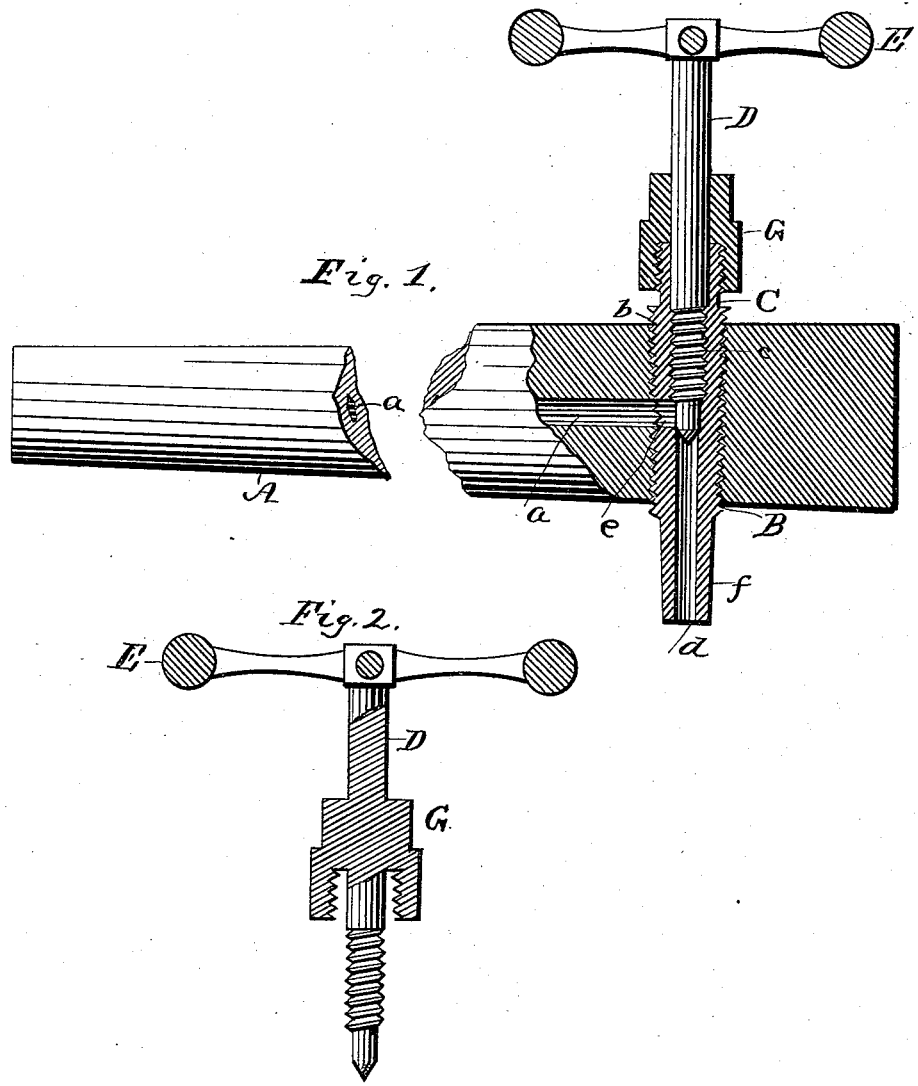
Witnesses.
Inventor
J. H. O'Connor
By S. H. Ginsabaugh
atty.

UNITED STATES PATENT OFFICE.

JAMES H. O'CONNOR, OF ROME, NEW YORK.

SPIGOT AND FAUCET.

SPECIFICATION forming part of Letters Patent No. 326,448, dated September 15, 1885.

Application filed January 29, 1885. (No model.)

*To all whom it may concern:*

Be it known that I, JAMES H. O'CONNOR, a citizen of the United States, residing at Rome, in the county of Oneida and State of New York, have invented certain new and useful Improvements in Spigots and Faucets, of which the following is a specification, reference being had therein to the accompanying drawings.

My invention relates to improvements in spigots and faucets.

The object of my invention is to provide a spigot for faucets which can be readily operated, and which will not injure the liquid drawn therethrough.

My invention consists of a wooden faucet provided with a metallic bushing or spigot, into which is screwed or otherwise secured a metallic plug for opening and closing the orifice of the bushing or spigot, as will more fully appear.

Referring to the drawings, Figure 1 is a side view, partly in section, of my invention. Fig. 2 is a sectional view of the stem or plug which enters the bushing or spigot portion of the device.

A is the main body of the faucet, which is preferably made of wood of the usual form, and having the longitudinal duct or channel *a* extending centrally from the rear or tapering end to a point near the front or large end of the faucet.

B is a screw-threaded aperture formed in the faucet A, and adapted to receive the body of the spigot or bushing C.

The spigot or bushing C is provided with external screw-threads *b* to fit into the screw-threads of the aperture B, and with internal screw-threads *c* to receive the threads of the screw formed on the stem or plug D.

The body or bushing C is provided with a central aperture, *d*, the upper portion of which is screw-threaded, as above indicated, and also with a lateral or side opening, *e*, which registers with the opening or channel *a* in the faucet A.

The lower end of the bushing or spigot extends a short distance below the faucet A, so as to form an exit-spout, *f*.

The stem or plug D is provided with a hand wheel or lever, E, at its upper end, by which the stem is operated, while the lower end is ground or turned to a cone shape, so it will fit snugly and tightly within the upper end of the aperture *d*, so that the liquid within the cask can be drawn off by raising the stem and shut off by the depressing or screwing down of the stem.

G is a packing box or ring, adapted to screw onto the upper end of the bushing or spigot C, as shown in Fig. 1; or it may be rigidly secured to the stem, as shown in Fig. 2, and in the application of either form rubber or other packing material can be used, if desired, in the ordinary manner.

The spigot or bushing C and stem or plug D are made of pure white metal, so that the liquid drawn therethrough is in no way affected by coming in contact with it.

My device is specially adapted for use in drawing beer and ale from the casks, but may be applied to other uses where it is desirable to draw the liquid through wooden faucets, in order that the natural flavor of the liquid will not be impaired by coming in contact with corroding metal, and by making the faucet with a bushing or spigot and valve-stem of metal I provide a perfectly tight and uniform joint, which is not affected by the swelling of the wood under the influence of the liquid, as is the case with wooden faucets and wooden spigots, or where a wooden faucet and the ordinary metal spigot is used.

Having thus described my invention, what I claim, and desire to secure by Letters Patent, is—

The combination, in a faucet, with the externally and internally screw-threaded bushing extending through the same, provided with an aperture adapted to register with the eduction-passage in the body of the spigot, of the screw-threaded valve-stem having a conical point and a packing box or ring secured thereto, as set forth.

In testimony whereof I have affixed my signature in presence of two witnesses.

JAMES H. O'CONNOR.

Witnesses:
LEVERETT E. SEYMOUR,
JNO. J. BRODT.